United States Patent
Majdabadi et al.

(10) Patent No.: US 12,549,940 B2
(45) Date of Patent: Feb. 10, 2026

(54) MOBILE DEVICE PRIVACY PROTECTION IN PUBLIC SPACES

(71) Applicant: INTERNATIONAL BUSINESS MACHINES CORPORATION, Armonk, NY (US)

(72) Inventors: Hamid Majdabadi, Ottawa (CA); Su Liu, Austin, TX (US); Neil Delima, Scarborough (CA); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 18/340,316

(22) Filed: Jun. 23, 2023

(65) Prior Publication Data
US 2024/0430666 A1    Dec. 26, 2024

(51) Int. Cl.
*H04W 12/02* (2009.01)
*H04W 12/63* (2021.01)
*H04W 68/00* (2009.01)

(52) U.S. Cl.
CPC ........... *H04W 12/02* (2013.01); *H04W 12/63* (2021.01); *H04W 68/005* (2013.01)

(58) Field of Classification Search
CPC .... H04W 12/02; H04W 12/63; H04W 68/005
USPC ........................................................ 455/411
See application file for complete search history.

(56) References Cited

U.S. PATENT DOCUMENTS

| | | |
|---|---|---|
| 8,068,986 B1 | 11/2011 | Shahbazi |
| 2015/0113666 A1 | 4/2015 | Buck |
| 2016/0364579 A1 | 12/2016 | Wilmes |
| 2021/0209216 A1 | 7/2021 | Baik |

FOREIGN PATENT DOCUMENTS

WO    2022159102 A1    7/2022

OTHER PUBLICATIONS

ASMAG.com, Security and IoT, "VideoSurveillance.com launches crowdsourced security camera map in Boston", Apr. 18, 2014, 3 pages, https://www.asmag.com/showpost/16950.aspx.
Bradley, "How crowdsourcing tools are building more powerful maps", GEOTAB, Published on Mar. 15, 2017, 9 pages, https://www.geotab.com/blog/crowdsourcing-tools/.
Chan, "Real-time Map Matching in Streaming Analytics Service", IBM, Oct. 21, 2016, 3 pages, https://www.ibm.com/cloud/blog/real-time-map-matching-streaming-analytics-service.

(Continued)

*Primary Examiner* — Joel Ajayi
(74) *Attorney, Agent, or Firm* — Jordan T. Schiller

(57) ABSTRACT

A method for controlling user device privacy protection in a public space. In response to receiving an attempt to log-on to a user device in a location, the method accesses a surveillance camera mapping for the location. The method further detects one or more surveillance cameras within a proximity of the user device and notifies a user about the proximity and potential exposure of the user device, based on the detected one or more surveillance cameras. The method prompts the user to receive guidance to an alternate location, within the proximity, to access the user device away from the one or more surveillance cameras and guides the user to the alternate location using the surveillance camera mapping, in response to receiving an affirmative response from the user. The method further enables the user to complete the log-on to the user device.

12 Claims, 3 Drawing Sheets

(56) References Cited

OTHER PUBLICATIONS

Chen, "Smartphone passcode prediction", IET Information Security, Research Article, Apr. 14, 2018, 7 pages, https://www.researchgate.net/publication/324863062_Smartphone_Passcode_Prediction.

Crawley, "5 Ways to Find Hidden Cameras Using Your Mobile Phone", Mar. 13, 2023, 11 pages, https://www.makeuseof.com/tag/use-smartphone-detect-hidden-surveillance-cameras/.

Grand View Research, "GVR Report cover Mobile Security Market Size, Share & Trends Report Mobile Security Market Size, Share & Trends Analysis Report by Offerings (Solutions, Services), by End Use (Enterprises, Individuals),by Organization, by Industry Vertical, and Segment Forecasts, 2020-2027", Report Overiew, accessed on Apr. 24, 2023, 9 pages, https://www.grandviewresearch.com/industry-analysis/mobile-security-market#.

IBM, "IBM Security MaaS360 with Watson", accessed Apr. 24, 2023, 9 pages, https://www.ibm.com/products/maas360.

IBM, "Mobile device management (MDM) solutions", accessed on Apr. 24, 23, 9 pages, https://www.ibm.com/products/maas360/mobile-device-management.

MOBILE DEVICE PRIVACY PROTECTION IN PUBLIC SPACES

BACKGROUND

The present disclosure relates generally to the field of cognitive computing and more particularly to data processing and data security on mobile devices in public domains.

Video cameras, or closed-circuit television (CCTV), are becoming a more and more widespread feature of our daily life and are changing the character of our public spaces. From airports to city streets, CCTV is the eye in the sky that includes some very smart and high-resolution cameras with night vision.

In many instances, CCTV is capable of image recording with zoom capabilities, extracting incredibly clear details on distant objects without reducing image quality.

Nowadays, mobile devices are used by people everywhere they go, including in public spaces. Because the information displayed on mobile device screens may be private or confidential (e.g., bank account information, credit card information, health information, passwords, and text messages to/from friends and colleagues), users are mostly self-conscious if they know there are surveillance video cameras around.

Protecting our device content is crucial to our privacy. However, there are situations where we need to access and navigate through our mobile device content, not noticing that we are in a public area being monitored by surveillance cameras and other security optical devices.

BRIEF SUMMARY

Embodiments of the present invention disclose a method, a computer program product, and a system.

According to an embodiment, a method, in a data processing system including a processor and a memory, for controlling user device privacy protection in a public space. In response to receiving an attempt to log-on to a user device in a location, the method accesses a surveillance camera mapping for the location. The method further detects one or more surveillance cameras within a proximity of the user device and notifies a user about the proximity and potential exposure of the user device, based on the detected one or more surveillance cameras. The method prompts the user to receive guidance to an alternate location, within the proximity, to access the user device away from the one or more surveillance cameras and guides the user to the alternate location using the surveillance camera mapping, in response to receiving an affirmative response from the user. The method further enables the user to complete the log-on to the user device.

A computer program product, according to an embodiment of the invention, includes a non-transitory tangible storage device having program code embodied therewith. The program code is executable by a processor of a computer to perform a method. In response to receiving an attempt to log-on to a user device in a location, the method accesses a surveillance camera mapping for the location. The method further detects one or more surveillance cameras within a proximity of the user device and notifies a user about the proximity and potential exposure of the user device, based on the detected one or more surveillance cameras. The method prompts the user to receive guidance to an alternate location, within the proximity, to access the user device away from the one or more surveillance cameras and guides the user to the alternate location using the surveillance camera mapping, in response to receiving an affirmative response from the user. The method further enables the user to complete the log-on to the user device.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. In response to receiving an attempt to log-on to a user device in a location, the method accesses a surveillance camera mapping for the location. The method further detects one or more surveillance cameras within a proximity of the user device and notifies a user about the proximity and potential exposure of the user device, based on the detected one or more surveillance cameras. The method prompts the user to receive guidance to an alternate location, within the proximity, to access the user device away from the one or more surveillance cameras and guides the user to the alternate location using the surveillance camera mapping, in response to receiving an affirmative response from the user. The method further enables the user to complete the log-on to the user device.

DETAILED DESCRIPTION

Figure 1:
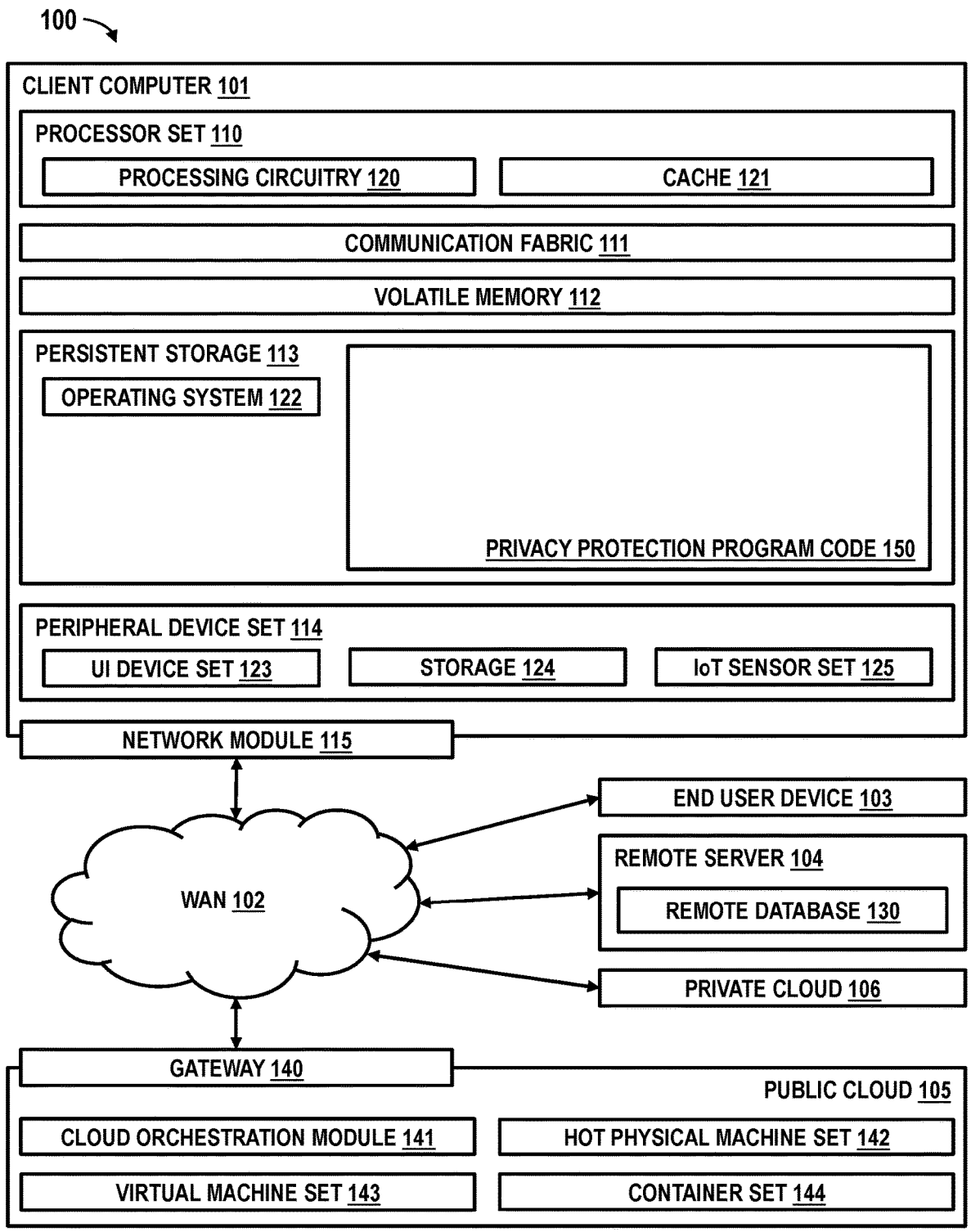
FIG. 1 depicts a diagram graphically illustrating the hardware components of a computing environment 100, such as privacy protection program computing environment 200, and a cloud computing environment, in accordance with an embodiment of the present invention.

People use their mobile devices anywhere and anytime to run various applications. The information shown on their mobile device screens are exposed to nearby and authorized surveillance, security, and community cameras. Just imagine being in a public domain like a subway station, airport, or shopping mall and having to authenticate your mobile device and navigate through content not knowing you are being exposed to multiple proximity high-definition cameras pointing at your device in real-time.

General video surveillance laws in the United States allow for monitoring and recording in areas where there is no "reasonable expectation of privacy".

In the past decade, the capabilities of surveillance cameras have been transformed by fundamental shifts in how digital data is gathered, analyzed, shared, and stored. Security cameras are already playing a key role in the drive to smarter cities and the burgeoning industrial internet of things (IoT). Deep learning and artificial intelligence (AI) are becoming more prevalent, as cameras can more accurately gather data and make predictions based on integrated analytical software that manufacturers have developed.

Since surveillance cameras are only allowed in areas where one does not have a reasonable expectation of privacy, security cameras used in most public venues (e.g., stores, train and subway stations, airports, bus stations, public streets, and sidewalks, etc.) are permissible.

Unlocking password protected devices or navigating sensitive or private applications and content in a public domain surrounded by surveillance cameras is a significant threat to individual privacy.

The present invention proposes a method to intelligently identify, detect, and act, through connected IoT and integrated data, related to optical surveillance devices correlated with crowdsourcing indoor surveillance camera mapping to protect a user's privacy from unintentional exposure of confidential information on a user mobile device. The present invention further recommends a safe nearby location to resume mobile device use, away from surveillance camera exposure.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a diagram graphically illustrating the hardware components of a computing environment 100, such as privacy protection program computing environment 200, and a cloud computing environment in accordance with an embodiment of the present invention.

Computing environment 100 contains an example of an environment for the execution of at least some of the computer code involved in performing the inventive methods, such as privacy protection program code 150. In addition to the privacy protection program code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and privacy protection program code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in privacy protection program code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in privacy protection program code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
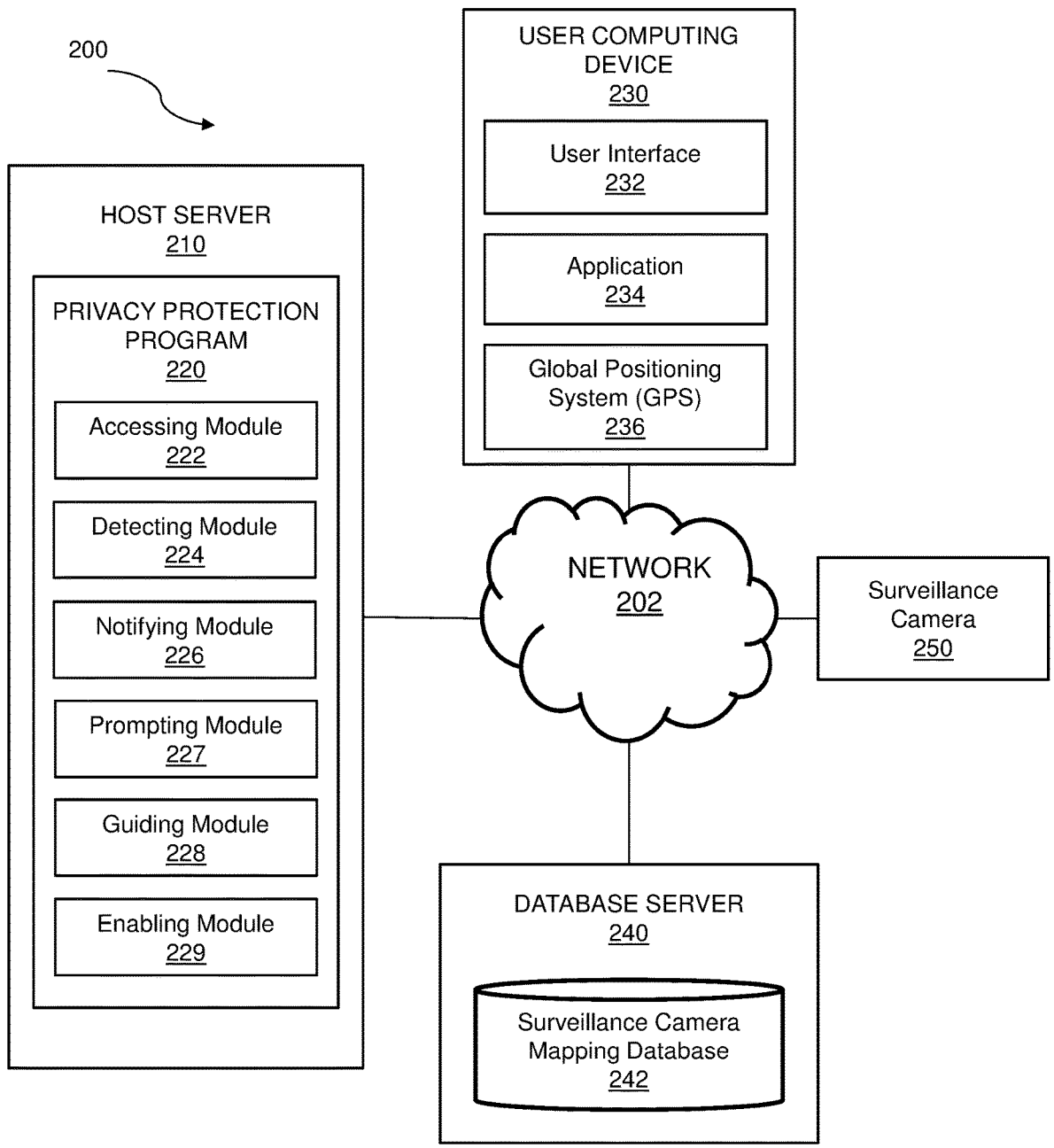
FIG. 2 illustrates privacy protection program computing environment 200, in accordance with an embodiment of the present invention.

FIG. 2 illustrates privacy protection computing environment 200, in accordance with an embodiment of the present invention. Privacy protection computing environment 200 includes host server 210, user computing device 230, database server 240, and surveillance camera 250, all connected via network 202. The setup in FIG. 2 represents an example embodiment configuration for the present invention and is not limited to the depicted setup to derive benefit from the present invention.

In an exemplary embodiment, host server 210 includes privacy protection program 220. In various embodiments, host server 210 may be a laptop computer, tablet computer, netbook computer, personal computer (PC), a desktop computer, a personal digital assistant (PDA), a smart phone, or any programmable electronic device capable of communicating with user computing device 230, database server 240, and surveillance camera 250, via network 202. Host server 210 may include internal and external hardware components, as depicted, and described in further detail with reference to FIG. 1. In other embodiments, host server 210 may be implemented in a cloud computing environment, as further described in relation to FIG. 1. Host server 210 may also have wireless connectivity capabilities allowing it to communicate with user computing device 230, database server 240, surveillance camera 250, and other computers or servers over network 202.

With continued reference to FIG. 2, user computing device 230 includes user interface 232, application 234, and global positioning system (GPS) 236. In various embodiments, user computing device 230 may be a laptop computer, tablet computer, netbook computer, personal computer (PC), a desktop computer, a personal digital assistant (PDA), a smart phone, a server, a wearable device, or any programmable electronic device capable of communicating with host server 210, database server 240, and surveillance camera 250 via network 202. User computing device 230 may include internal and external hardware components, as depicted, and described in further detail with reference to FIG. 1. In other embodiments, user computing device 230 may be implemented in a cloud computing environment, as described in relation to FIG. 1. User computing device 230 may also have wireless connectivity capabilities allowing it to communicate with host server 210, database server 240, surveillance camera 250, and other computers or servers over network 202.

In exemplary embodiments, user computing device 230 includes user interface 232, which may be a computer program that allows a user to interact with user computing device 230 and other connected devices via network 202. For example, user interface 232 may be a graphical user interface (GUI). In addition to comprising a computer program, user interface 232 may be connectively coupled to hardware components, such as those depicted in FIG. 1, for sending and receiving data. In an exemplary embodiment, user interface 232 may be a web browser, however in other embodiments user interface 232 may be a different program capable of receiving user interaction and communicating with other devices, such as host server 210.

In exemplary embodiments, user interface 232 may be a touch screen display, a visual display, a remote operated display, or a display that receives input from a physical keyboard or touchpad. In alternative embodiments, user interface 232 may be operated via voice commands or by any other means known to one of ordinary skill in the art.

In exemplary embodiments, user computing device 230 includes application 234, which may be a software program capable of being run on a user mobile device, such as user computing device 230.

In exemplary embodiments, application 234 requires an authentication to log-on and typically includes a username and password or any other authentication method known to one of ordinary skill in the art. As such, information contained within application 234 is private and confidential and meant solely for the eyes of the user of the mobile device.

Various examples of application 234 may include, but are not limited to, a bank account application, a social media application, a credit card application, an insurance application, an e-mail account, a social messaging application, a calendar application, a call history application, and so forth.

In exemplary embodiments, GPS 236 is a computer program on user computing device 230 that provides time and location information for user computing device 230. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers can determine the location where the signals were received. In exemplary embodiments, GPS 236 can provide real-time location detection of a user computing device 230.

In exemplary embodiments, GPS 236 can provide a location proximity of a user computing device 230 with one or more surveillance cameras 250 within a public domain.

In exemplary embodiments, GPS 236 can provide alternate locations, in real-time, away from detected surveillance cameras 250 for a user to engage with their user computing device 230, based on surveillance camera mappings, as detected in surveillance camera mapping database 242.

In exemplary embodiments, database server 240 includes surveillance camera mapping database 242. In various embodiments, database server 240 may be a laptop computer, tablet computer, netbook computer, personal computer (PC), a desktop computer, a personal digital assistant (PDA), a smart phone, a server, or any programmable electronic device capable of communicating with host server 210, user computing device 230, and surveillance camera 250 via network 202. Database server 240 may include internal and external hardware components, as depicted and described in further detail with reference to FIG. 1. In other embodiments, database server 240 may be implemented in a cloud computing environment, as described in relation to FIG. 1. Database server 240 may also have wireless connectivity capabilities allowing it to communicate with host server 210, user computing device 230, surveillance camera 250, and other computers or servers over network 202.

In exemplary embodiments, surveillance camera mapping database 242 contains various public locations and mapped surveillance cameras at respective public locations. For example, surveillance camera mapping database 242 may include mapped surveillance camera locations at public airports (e.g., JFK airport, LaGuardia airport, etc.), outdoor city streets (e.g., New York City, Boston, Miami, etc.) and any other public domain.

In alternative embodiments, surveillance camera mapping database 242 may update mapped surveillance camera locations at public domains based on crowdsourcing collaboration and user verification.

While surveillance camera mapping database 242 is depicted as being stored on database server 240, in other embodiments, surveillance camera mapping database 242 may be stored on user computing device 230, host server 210, privacy protection program 220, or any other device or database connected via network 202, as a separate database. In alternative embodiments, surveillance camera mapping database 242 may be comprised of a cluster or plurality of computing devices, working together, or working separately.

In exemplary embodiments, surveillance camera 250 may include a video camera, a CCTV, a 4K security camera system, or a network of video cameras with high performance image sensors that can capture videos at 3840×2160 pixels, or greater.

In alternative embodiments, surveillance camera 250 may include image recording with zoom capability, together with audio recording and any other known video recording capability known to one of ordinary skill in the art.

With continued reference to FIG. 2, host server 210 includes privacy protection program 220. Host server 210 may be a laptop computer, tablet computer, netbook computer, personal computer (PC), a desktop computer, a personal digital assistant (PDA), a smart phone, or any programmable electronic device capable of communicating with user computing device 230, database server 240, and surveillance camera 250, via network 202.

With continued reference to FIG. 2, privacy protection program 220, in an exemplary embodiment, may be a computer application on host server 210 that contains instruction sets, executable by a processor. The instruction sets may be described using a set of functional modules. In exemplary embodiments, privacy protection program 220 may receive input from user computing device 230, database server 240, and surveillance camera 250, over network 202. In alternative embodiments, privacy protection program 220 may be a computer application on user computing device 230, or a standalone program on a separate electronic device.

With continued reference to FIG. 1, the functional modules of privacy protection program 220 include accessing module 222, detecting module 224, notifying module 226, prompting module 227, guiding module 228, and enabling module 229.

Figure 3:
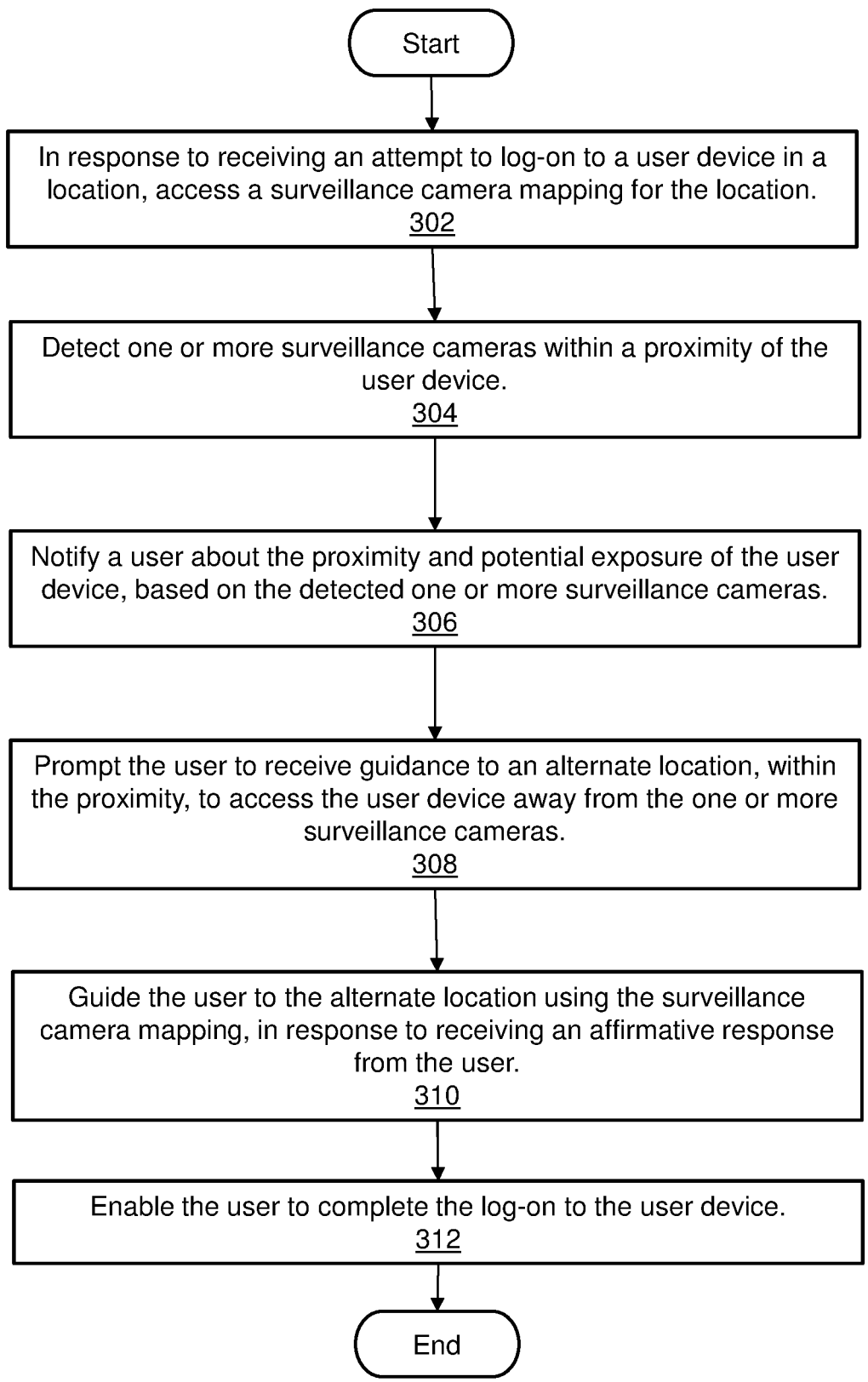
FIG. 3 is a flowchart illustrating the operation of privacy protection program 220 of FIG. 2, in accordance with an embodiment of the present invention.

FIG. 3 is a flowchart illustrating the operation of privacy protection program 220 of FIG. 2, in accordance with embodiments of the present disclosure.

With reference to FIGS. 2 and 3, accessing module 222 includes a set of programming instructions, in privacy protection program 220, to access a surveillance camera mapping for a location, in response to receiving an attempt to log-on to a user device in the location (step 302). The set of programming instructions is executable by a processor.

In exemplary embodiments, privacy protection program 220 may prevent a user from logging-on to a user computing device 230, based on a user's preferences and location.

In exemplary embodiments, privacy protection program 220 may include an opt-in feature, enabling a user to set preferences (e.g., give or revoke permissions) for detection, monitoring, and identifying a user's location.

In further exemplary embodiments, a user may define custom prompts when accessing the user device (e.g., user computing device 230) in a public space. Further, accessing module 222 triggers the defined custom prompts based on user engagement with the user device. For example, accessing module 222 may automatically lock the user device (e.g., put in flight mode/turn off Bluetooth) when one or more surveillance cameras are detected within a proximity of the user device, or accessing module 222 may automatically unlock the user device when a safe location is detected away from the one or more surveillance cameras.

In alternative embodiments, activation of accessing module 222 may be customized for when and how to initiate, based on user preferences. For example, accessing module 222 may be set to activate when in a crowded public domain and further action may be required from the user to log-on to the mobile device. Alternatively, accessing module 222 may be overridden (i.e., or not activated) based on other user preferences.

In further exemplary embodiments, accessing module 222 may require the user to log-on to the user device (e.g., user computing device 230) to access a personal application (e.g., banking application, social media application, business document, etc.) when in a crowded public domain and not require the user to log-on to the user device to access a non-confidential application (e.g., camera, alarm clock, weather, music, etc.) on the user device to take a picture, check the time, check the weather, listen to music, and so forth, when in the crowded public domain.

Accessing module 222, in exemplary embodiments, obtains a current location of a user, via GPS 236, and accesses surveillance camera mapping database 242 based on the current location of the user.

With reference to an illustrative example, Bruce is at the airport waiting for his flight. He is required to log-on to his mobile device to check for business urgencies and flight status notifications. Bruce is sitting comfortably in the passenger waiting area close to the check-in counter and attempts to engage with his mobile device. First, he must authenticate his device to log-on and navigate through the contents. With opt-in to privacy protection program 220, Bruce must log-on to his mobile device. Bruce proceeds to log-on to his device.

In an alternative illustrative example, without opting-in the privacy protection program, Bruce authenticates his mobile device and starts navigating his content (e.g., company data and other sensitive personal information). When he gets up, he notices that he was sitting just below one of the active airport surveillance cameras. Bruce is not sure if his password and some of the confidential content on his mobile device were comprised or not. Although it is the official airport asset, Bruce is not sure who will have access to the surveillance camera recordings and where they are stored and saved. Bruce is now deeply concerned about his privacy.

With continued reference to FIGS. 2 and 3, detecting module 224 includes a set of programming instructions in privacy protection program 220, to detect one or more surveillance cameras within a proximity of the user device (step 304). The set of programming instructions is executable by a processor.

In exemplary embodiments, the one or more surveillance cameras 250 are detected by IoT enablement. For example, mobile integrated IoT sensors within a public domain may be accessible by privacy protection program 220.

In exemplary embodiments, user computing device 230 is authorized to communicate with IoT beacons and share device identification (ID).

In exemplary embodiments, service engagement is based on associating locally maintained IoT tokens (e.g., within a user's domain) shared with the privacy protection program 220 and further based on IoT token expiration.

In alternative embodiments, sharing device resources are anonymized and local to the user's mobile device (e.g., user computing device 230) to protect privacy.

In exemplary embodiments, a user's mobile device IoT sensors may be triggered by the user engagement settings with privacy protection program 220 to define custom prompts when accessing the mobile device in public. For example, if the user is just listening to music in the presence of surveillance cameras, then there will be no prompt on the user mobile device to change locations away from the surveillance cameras.

In further exemplary embodiments, user computing device 230 is authorized to share GPS location information with privacy protection program 220. A user may opt-out of information sharing with privacy protection program 220 at any time, at user's discretion.

In exemplary embodiments, a user authorizes their mobile device, or user computing device 230, to integrate with privacy protection program 220.

In alternative embodiments, the one or more surveillance cameras 250 are detected by crowdsourced mapping. For example, the authenticated user on the user computing device 230 is a participant of a collaborative crowdsourcing platform to leverage and update, in real-time, surveillance camera mapping and stored in surveillance camera mapping database 242. As such, the user participates in adding, updating, or confirming the crowdsourced surveillance mapping.

In alternative embodiments, surveillance camera map details may be downloaded and used in offline mode.

In further alternative embodiments, the user can opt-out of all surveillance-based IoT data in proximity push notification advertising and/or tracking.

In further alternative embodiments, surveillance map contributors (i.e., crowd-sourcers) are incentivized by sponsors with a focus on surrounding and zoned commercial outlets offering time-based special promotions.

With continued reference to the illustrative example above, as soon as Bruce attempts to log-on to his mobile device, detecting module 224 detects several surveillance cameras within his vicinity, based on identified IoT sensors.

With continued reference to FIGS. 2 and 3, notifying module 226 includes a set of programming instructions in privacy protection program 220, to notify a user about the proximity and potential exposure of the user device, based on the detected one or more surveillance cameras (step 306). The set of programming instructions is executable by a processor.

In exemplary embodiments, based on user's preference settings, notifying module 226 notifies the user of surveillance cameras 250 within a proximity of user, based on IoT detection.

Alternatively, notifying module 226 notifies a user about the proximity and potential exposure of the user device based on crowdsourcing and surveillance camera mapping database 242 compared with a user's identified location (e.g., GPS 236).

With continued reference to the illustrative example above, a prompt on Bruce's mobile device notifies him about the proximity and exposure to a known surveillance camera based on IoT sensors.

With continued reference to FIGS. 2 and 3, prompting module 227 includes a set of programming instructions in privacy protection program 220, to prompt the user to receive guidance to an alternate location, within the proximity, to access the user device away from the one or more surveillance cameras (step 308). The set of programming instructions is executable by a processor.

In exemplary embodiments, prompting module 227 recommends, in real-time, a safe location to the user away from the one or more surveillance cameras, based on GPS and a real-time mapping engine.

In exemplary embodiments, a user has the option to follow the prompt on the user mobile device and accept an alternative safe location to engage with the device or stay in the current location and be cognizant that there are surveillance cameras 250 nearby.

With continued reference to the illustrative example above, prompting module 227 gives Bruce an option to be guided to a nearby safe spot, within the airport, to engage with his mobile device.

With continued reference to FIGS. 2 and 3, guiding module 228 includes a set of programming instructions in privacy protection program 220, to guide the user to an alternate location using the surveillance camera mapping, in response to receiving an affirmative response from the user (step 310). The set of programming instructions is executable by a processor.

In exemplary embodiments, guiding module 228 directs the user to a safe location, away from the one or more surveillance cameras, based on GPS 236. For example, guiding module 228 may give step by step directions to a user (e.g., walk straight for 21 meters, turn left at the clothing store, then turn right in 15 meters at the food court, walk straight for 25 meters).

With continued reference to the illustrative example above, guiding module 228 navigates Bruce around the airport to a safe spot to continue engaging with his mobile device.

In an alternative illustrative example, Bruce is on his way to a safe spot and curiously looks around the airport ceiling for mounted security cameras and notes a few of them. When he arrives to the recommended safe spot, privacy protection program 220 has an optional view of the surveillance camera map. Bruce studies the map and notices that there are some areas where the mapping engine has not picked up several surveillance cameras. Bruce selects the missing locations and tags them as "pending spots for further approval and verification" by other users, to become a verified location ID.

With continued reference to FIGS. 2 and 3, enabling module 229 includes a set of programming instructions in privacy protection program 220, to enable the user to complete the log-on to the user device (step 312). The set of programming instructions is executable by a processor.

With continued reference to the illustrative example above, once Bruce arrives at the safe alternative location, enabling module 229 enables Bruce to safely log-on to his mobile device, free to check his confidential business urgencies without worry about his privacy.

In an alternative illustrative example, Maria is at the shopping mall inside a store, and receives a text message from her financial broker. Maria needs to engage with her mobile device to access the text message. Maria has opted-in to privacy protection program 220 and, as such, as soon as she opens her mobile device a notification is displayed indicating that there are surrounding surveillance cameras all around the store, close enough to zoom into Maria's mobile device text and details. She is not comfortable and accepts the prompt to guide her outside of the store to a safe zone to review the received text message.

Alternatively, had Maria not opted-in to privacy protection program 220, she would have logged-on to her mobile device to read the received text message while in the store. Maria probably would have responded to the text message with requested confidential financial details that would have possibly jeopardized her financial privacy.

In exemplary embodiments, network 202 is a communication channel capable of transferring data between connected devices and may be a telecommunications network used to facilitate telephone calls between two or more parties comprising a landline network, a wireless network, a closed network, a satellite network, or any combination thereof. In another embodiment, network 202 may be the Internet, representing a worldwide collection of networks and gateways to support communications between devices connected to the Internet. In this other embodiment, network 202 may include, for example, wired, wireless, or fiber optic connections which may be implemented as an intranet network, a local area network (LAN), a wide area network (WAN), or any combination thereof. In further embodiments, network 202 may be a Bluetooth network, a WiFi network, or a combination thereof. In general, network 202 can be any combination of connections and protocols that will support communications between host server 210, user computing device 230, database server 240, and surveillance camera 250.

The invention claimed is:

1. A computer-implemented method for user device privacy protection in a public space, comprising:
   in response to receiving an attempt to log-on to a user device in a location, accessing a surveillance camera mapping for the location;
   detecting one or more surveillance cameras within a proximity of the user device, wherein the one or more surveillance cameras are detected by internet of things (IoT) enablement and crowdsourced mapping;
   notifying a user about the proximity and potential exposure of the user device, based on the detected one or more surveillance cameras, wherein the user of the user device is a participant of a collaborative crowdsourcing module to leverage and update, in real-time, the surveillance camera mapping;
   prompting the user to receive guidance to an alternate location, within the proximity, to access the user device away from the one or more surveillance cameras;
   recommending, in real-time, a safe location to the user based on global positioning system (GPS) and a real-time mapping engine;
   directing the user to the safe location, away from the one or more surveillance cameras, based on GPS;
   guiding the user to the alternate location using the surveillance camera mapping, in response to receiving an affirmative response from the user; and
   enabling the user to complete the log-on to the user device.

2. The computer-implemented method of claim 1, further comprising:
   defining custom prompts, by the user, when accessing the user device in a public space; and
   triggering the defined custom prompts based on user engagement with the user device.

3. The computer-implemented method of claim 2, further comprising:
   automatically locking the user device when one or more surveillance cameras are detected within a proximity of the user device; and
   automatically unlocking the user device when a safe location is detected, away from the one or more surveillance cameras.

4. The computer-implemented method of claim 2, further comprising:
   requiring the user to log-on to the user device to access a personal application, when in a crowded public domain; and
   not requiring the user to log-on to the user device to access a camera on the user device to take a picture, when in the crowded public domain.

5. A computer program product, comprising a non-transitory tangible storage device having program code embodied therewith, the program code executable by a processor of a computer to perform a method, the method comprising:
- in response to receiving an attempt to log-on to a user device in a location, accessing a surveillance camera mapping for the location;
- detecting one or more surveillance cameras within a proximity of the user device, wherein the one or more surveillance cameras are detected by internet of things (IOT) enablement and crowdsourced mapping;
- notifying a user about the proximity and potential exposure of the user device, based on the detected one or more surveillance cameras, wherein the user of the user device is a participant of a collaborative crowdsourcing module to leverage and update, in real-time, the surveillance camera mapping;
- prompting the user to receive guidance to an alternate location, within the proximity, to access the user device away from the one or more surveillance cameras;
- recommending, in real-time, a safe location to the user based on global positioning system (GPS) and a real-time mapping engine;
- directing the user to the safe location, away from the one or more surveillance cameras, based on GPS;
- guiding the user to the alternate location using the surveillance camera mapping, in response to receiving an affirmative response from the user; and
- enabling the user to complete the log-on to the user device.

6. The computer program product of claim 5, further comprising:
- defining custom prompts, by the user, when accessing the user device in a public space; and
- triggering the defined custom prompts based on user engagement with the user device.

7. The computer program product of claim 6, further comprising:
- automatically locking the user device when one or more surveillance cameras are detected within a proximity of the user device; and
- automatically unlocking the user device when a safe location is detected, away from the one or more surveillance cameras.

8. The computer program product of claim 6, further comprising:
- requiring the user to log-on to the user device to access a personal application, when in a crowded public domain; and
- not requiring the user to log-on to the user device to access a camera on the user device to take a picture, when in the crowded public domain.

9. A computer system, comprising:
- one or more computer devices each having one or more processors and one or more tangible storage devices; and
- a program embodied on at least one of the one or more storage devices, the program having a plurality of program instructions for execution by the one or more processors, the program instructions comprising instructions for:
  - in response to receiving an attempt to log-on to a user device in a location, accessing a surveillance camera mapping for the location;
  - detecting one or more surveillance cameras within a proximity of the user device, wherein the one or more surveillance cameras are detected by internet of things (IoT) enablement and crowdsourced mapping;
  - notifying a user about the proximity and potential exposure of the user device, based on the detected one or more surveillance cameras, wherein the user of the user device is a participant of a collaborative crowdsourcing module to leverage and update, in real-time, the surveillance camera mapping;
  - prompting the user to receive guidance to an alternate location, within the proximity, to access the user device away from the one or more surveillance cameras;
  - recommending, in real-time, a safe location to the user based on global positioning system (GPS) and a real-time mapping engine;
  - directing the user to the safe location, away from the one or more surveillance cameras, based on GPS;
  - guiding the user to the alternate location using the surveillance camera mapping, in response to receiving an affirmative response from the user; and
  - enabling the user to complete the log-on to the user device.

10. The computer system of claim 9, further comprising:
defining custom prompts, by the user, when accessing the user device in a public space; and
triggering the defined custom prompts based on user engagement with the user device.

11. The computer system of claim 9, further comprising:
automatically locking the user device when one or more surveillance cameras are detected within a proximity of the user device; and
automatically unlocking the user device when a safe location is detected, away from the one or more surveillance cameras.

12. The computer system of claim 9, further comprising:
requiring the user to log-on to the user device to access a personal application, when in a crowded public domain; and
not requiring the user to log-on to the user device to access a camera on the user device to take a picture, when in the crowded public domain.

* * * * *